United States Patent
Harju et al.

(10) Patent No.: US 10,365,165 B2
(45) Date of Patent: Jul. 30, 2019

(54) PIPE CLAMP THERMOCOUPLE

(71) Applicants: Rey Harju, Anaheim, CA (US); Travis Ault, Anaheim, CA (US)

(72) Inventors: Rey Harju, Anaheim, CA (US); Travis Ault, Anaheim, CA (US)

(73) Assignee: Fieldpiece Instruments, Inc., Orange, CA (US)

( * ) Notice: Subject to any disclaimer, the term of this patent is extended or adjusted under 35 U.S.C. 154(b) by 154 days.

(21) Appl. No.: 15/235,021

(22) Filed: Jun. 7, 2017

(65) Prior Publication Data

US 2017/0268934 A1    Sep. 21, 2017

Related U.S. Application Data

(60) Provisional application No. 62/266,152, filed on Dec. 11, 2015, provisional application No. 62/203,703, filed on Aug. 11, 2015.

(51) Int. Cl.
| | | |
|---|---|---|
| *G01K 7/00* | (2006.01) | |
| *G01K 13/00* | (2006.01) | |
| *G01K 1/00* | (2006.01) | |
| *G01K 7/02* | (2006.01) | |
| *G01K 1/14* | (2006.01) | |

(52) U.S. Cl.
CPC ............... *G01K 7/023* (2013.01); *G01K 1/14* (2013.01)

(58) Field of Classification Search
USPC .................................. 374/179, 147, 208, 180
See application file for complete search history.

(56) References Cited

U.S. PATENT DOCUMENTS

| 4,121,460 | A | * | 10/1978 | Ekstrom | G01K 3/14 374/180 |
|---|---|---|---|---|---|
| 4,728,887 | A | * | 3/1988 | Davis | G01R 15/14 324/127 |
| 6,779,919 | B1 | * | 8/2004 | Staniforth | G01K 1/143 248/231.51 |
| 2007/0116087 | A1 | * | 5/2007 | Hsu | G01K 1/143 374/147 |
| 2009/0252199 | A1 | * | 10/2009 | Liu | G01K 1/146 374/208 |
| 2009/0268780 | A1 | * | 10/2009 | Liu | G01K 1/146 374/179 |
| 2016/0298317 | A1 | * | 10/2016 | Trescott | G01M 3/002 |

* cited by examiner

*Primary Examiner* — Mirellys Jagan
(74) *Attorney, Agent, or Firm* — K. David Crockett, Esq.; Paul J. Backofen, Esq.; Crockett & Crockett, PC

(57) ABSTRACT

A thermocouple assembly for measuring the temperature of a pipe, comprises a pipe clamp having a pair of dissimilar metal strips mounted therein to contact a pipe held in the pipe clamp. A thermocouple reading instrument is connected to the metal strips to indicate the temperature of the pipe.

4 Claims, 6 Drawing Sheets

Typical Thermocouple Circuit
(Sensing Junction is the Metal Plate or Bead)

Thermocouple Rail Circuit
(Sensing Junction is the Surface of Pipe Under Each Rail)

PIPE CLAMP THERMOCOUPLE

BACKGROUND OF THE INVENTION

This invention relates to measuring the temperature of fluids in a pipe. Refrigeration and air conditioning technicians need temperatures of fluids in pipes for proper adjustment. If they can get the temperature of the pipe itself, in most cases that's good enough.

Many companies supply products that include various mechanisms and technologies to get the temperature of the pipe. These include beaded thermocouples with a Velcro strap, thermistors in a 'clothespin' style clamp, and several different methods of using thermocouples in a plastic clamp.

There are primarily two thermocouple techniques used for pipe clamps. One is to weld the individual thermocouples to a metal plate, and then mechanically press the metal plate against the pipe. The thermocouple delivers a voltage proportional to somewhere between that delivered by the two junctions to the plate.

To accommodate a wider variety of pipes, the plate has to be "V" or "U" shaped. If the plate is a "V," at best there are two line-shaped contacts. Most of the contacting force for big pipes is on one plate, while the contacting force for the little pipe is on the other plate, with the varying force creating thermal conducting problems, since conductivity varies with the force applied.

Beyond that, the impediments to speed and accuracy with this technique are many, including that the plate dissipates heat to the environment easily due to big area of contact with ambient air. The contact point with the plate may be far from the thermocouple junctions; the contact spot changes as the jaws of the clamp get wider; the contact spot size may be small; the plate may absorb a lot of heat; the force between the contact plate and the pipe vary causing varying thermal conductance and the plate mounting mechanism (usually tabs) offers a path for heat to the environment. In addition, with any kind of clamp that has pivoting arms (like scissors or salad grabbers) the angle of the jaws vary as the clamp opens and closes, causing contact spot variability.

The other technique is to push a thermocouple junction made of ribbons of thermocouple material up against the pipe directly. This solves most of the problems of the plate, but is less rugged and more costly.

SUMMARY OF THE INVENTION

This invention provides a third thermocouple technique that uses thermocouple rails. Eliminating the plate and pressing thermocouple material (rails) up against the pipe directly provides a very fast response and an accurate reading. Its principle of operation is similar to that of the plate thermocouple device with the difference being the absence of a plate.

The plate, the contact spots, the weld locations, and the distance between the welds and the contact spot cause all the problems with the plate design. The rail design according to the present invention eliminates the problems associated with plate thermocouple devices by making the pipe itself the intermediary metal. The elegance of the present invention is that the contact spot is the thermal junction. The electrical junction that measures temperature is at exactly the same temp as the contact spot, because they are the same spot. Readings are much faster and more accurate than can be obtained using prior above-referenced thermocouple devices.

DETAILED DESCRIPTION OF THE INVENTION

Figure 1:
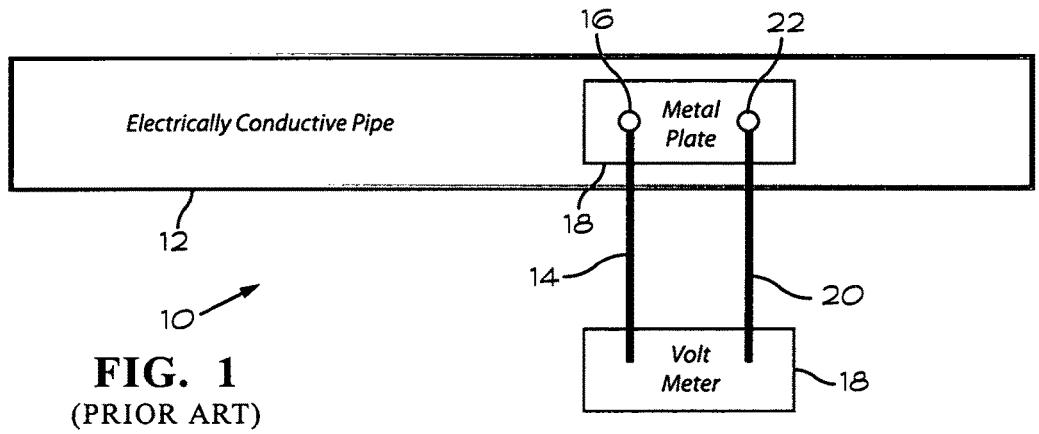
FIG. 1 is a functional block diagram showing the use of a prior art plate-type thermocouple device to measure the temperature of a pipe.

Referring to FIG. 1, a prior art thermocouple device 10 is arranged to measure the temperature of an electrically conducting pipe 12. The thermocouple device 10 includes a first thermocouple wire 14 that extends between a thermocouple 16 and a voltmeter adjustable 18. The thermocouple 16 is connected to the underside (as seen in FIG. 1) of a metal plate 18 by any convenient means such as welding or soldering. A second thermocouple wire 20 extends between the voltmeter 18 and a thermocouple 22 that is also connected to the underside of the metal plate 18. Temperature measurements using the thermocouple device 10 involve exerting pressure on the plate 18 to bring the thermocouples 16 and 22 into contact with the pipe 12. The temperature of the pipe 12 may then be determined by the voltage difference between the two thermocouples 16 and 22.

Figure 2:
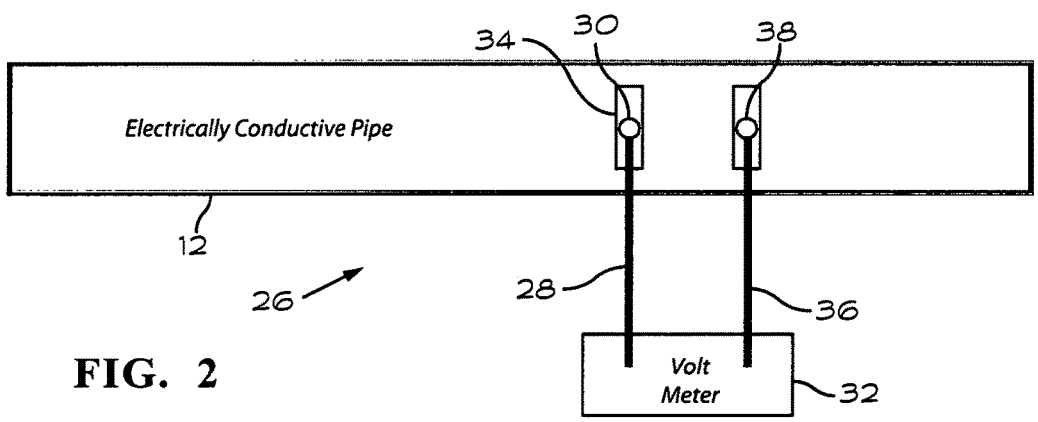
FIG. 2 is a functional block diagram showing the use of a thermocouple device according to the present invention to measure the temperature of a pipe.
Figure 3:
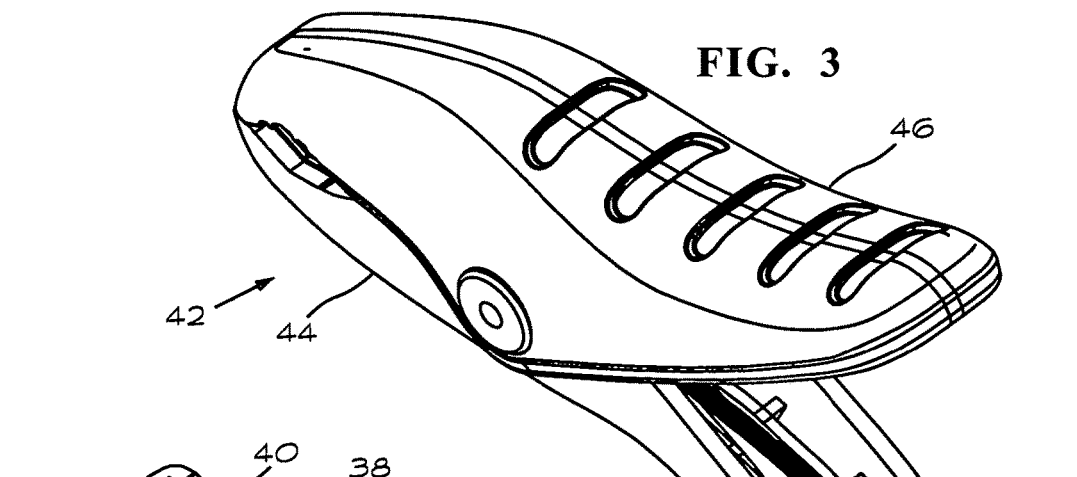
FIG. 3 illustrates a thermocouple device according to the present invention that includes a clamp and a thermocouple wire assembly associated with the clamp.
Figure 4:
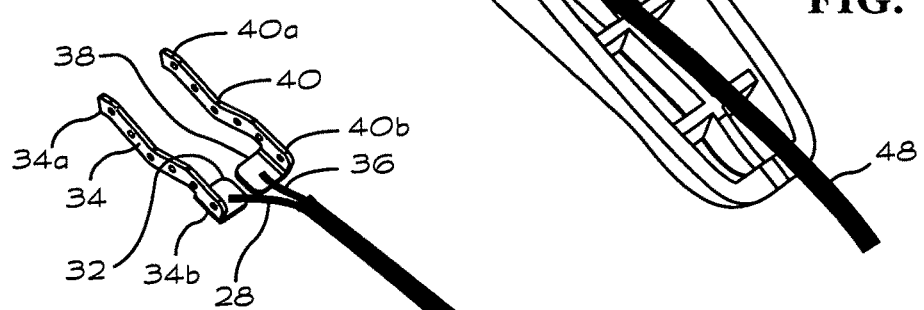
FIG. 4 illustrates half of the clamp of FIG. 3 with thermocouple wires connected to corresponding thermocouple rails.

FIG. 2 illustrates a thermocouple device 26 according to the present invention. A first thermocouple wire 28 extends between a thermocouple 30 and a voltmeter 32. The thermocouple 30 is connected to a first rail 34 that extends across the pipe 12. A second thermocouple wire 36 extends between the voltmeter 32 and a thermocouple 38 that is connected to a second rail 40 that is spaced apart from the rail 34. The thermocouples 30 and 38 are formed of dissimilar metals. The rails 34 and 40 are formed of the same metal as the corresponding thermocouples 30 and 38. The thermocouple wires 28 and 36 are formed of the same metal as their corresponding rails 34 and 40.

FIGS. 3, 4, 6 and 7 show the thermocouple device 26 according to the present invention mounted in a pipe clamp 42 that includes clamp halves 44 and 46. A thermocouple wire assembly 48 extends between the handles of the pipe clamp 42 to a location between the clamp jaws.

Figure 5:
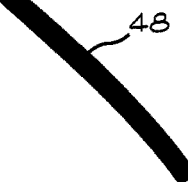
FIG. 5 illustrates thermocouple wires from the thermocouple wire assembly connected to corresponding thermocouple rails.

As best shown in FIG. 5, the separate thermocouple wires 28 and 36 extend out of the thermocouple wire assembly 48 and are connected to the thermocouples 30 and 38, respectively. The rails 34 and 40 may be parallel and arranged to extend transversely across the pipe 12. Alternatively, the rails 34 and 40 may be arranged such that space between the ends 34a and 40a differs from the space between the ends 34b and 40b. Having the rails 34 and 40 formed so that different distances between the corresponding ends are beneficial when the surface of the pipe 12 is dirty or corroded. The rails 34 and 40 may be placed in contact under pressure from the clamp 42 with the pipe 12. Rotating the clamp through a small angle about the pipe causes the rails 34 and 40 to plough away material on the surface of the pipe 12 so that the rails 34 and 40 and the thermocouples 32 and 38 make good thermal contact with the pipe 12.

Bringing the rails 34 and 40 into thermal contact with the pipe 12 creates two thermocouple junctions where each of the rails 34 and 40 contacts the pipe 12. A voltage is produced between the thermocouple junctions in accordance with the well-known thermoelectric effect. This voltage is processed to determine the temperature of the pipe.

Figure 6:
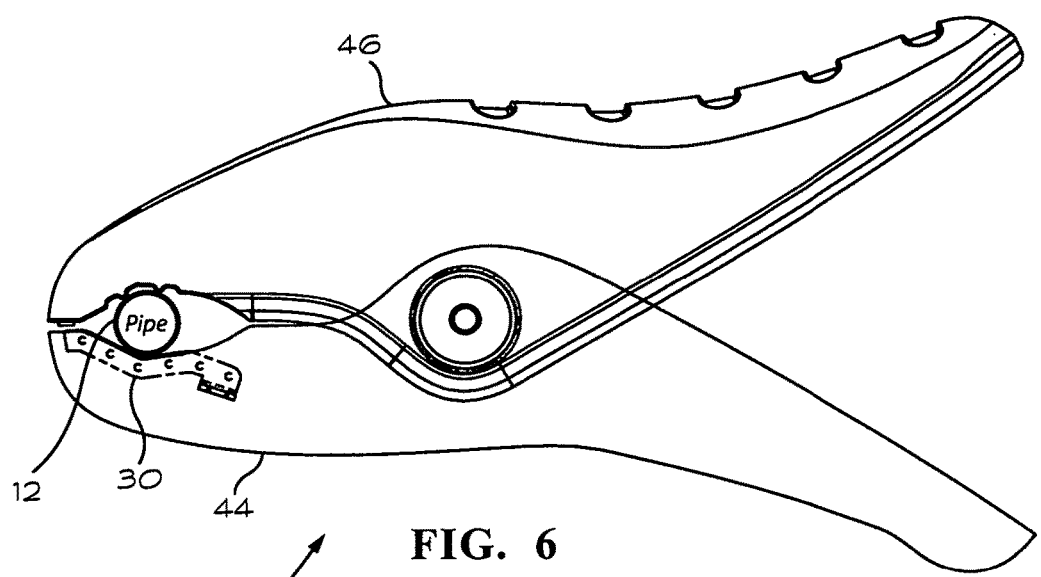
FIG. 6 illustrates a thermocouple device according to the present invention being used with a small diameter pipe.
Figure 7:
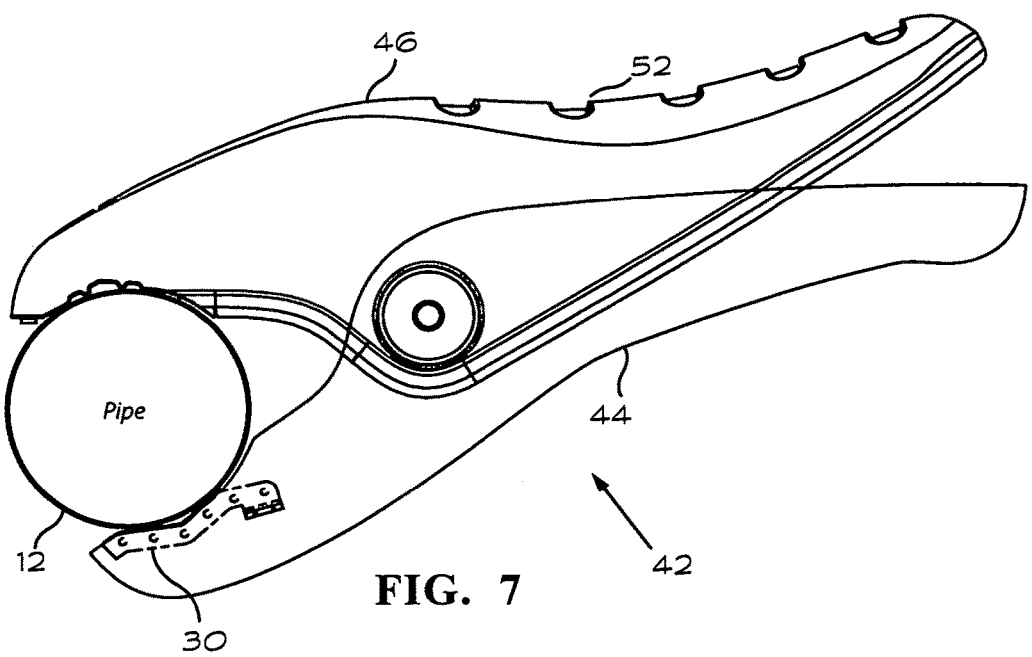
FIG. 7 illustrates a thermocouple device according to the present invention being used with a large diameter pipe.

The rails 34 and 40 may arranged at an angle relative to one another so that a wide range of pipe sizes may be measured using the same mechanical pivot style clamp 42 as shown in FIGS. 6 and 7. The angles of the rail 34 and 40 may be is such that the ends of the rails 34 and 40 closest to the outer end of the clamp 42 are slanted so that the largest pipe size is still pushed to the 'throat' of the clamp (doesn't 'spit' the pipe out). The inside end portions of the rails 34 and 40 are then angled to push the smallest pipe towards the jaw opening (doesn't 'swallow' the small pipe).

The rails 34 and 40 allow the pipe clamp 42 to be pulled toward the pipe 12 as the clamp 12 applies pressure to the pipe 12. This enables the clamp to have both more stability and higher resistance to coming off the pipe, or a lighter spring that is less expensive and easier to use. With the plate design, any 'cocking' of the installed pipe clamp in direction of the pipe causes the plate to be lifted off the pipe, with the contact spot only on the edge, thermally far away from the junction.

Figure 8:
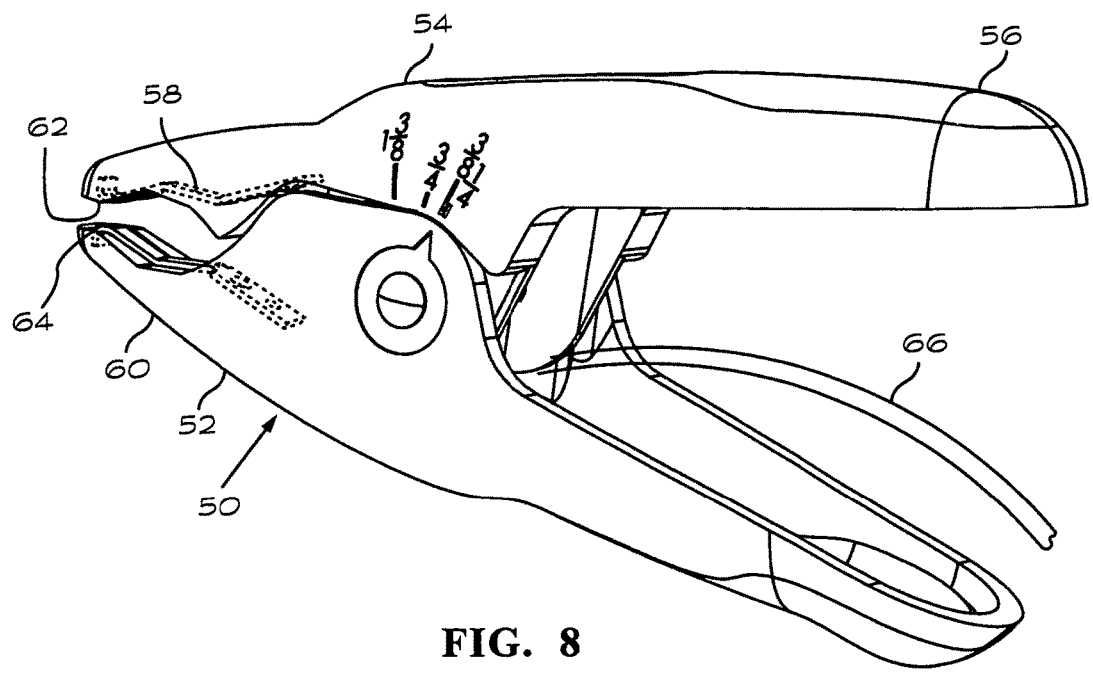
FIG. 8 is a perspective view of a second embodiment of a thermocouple clamp device according to the present invention that includes a pair of thermocouple slats that comprise thermocouple contacts.
Figure 9:
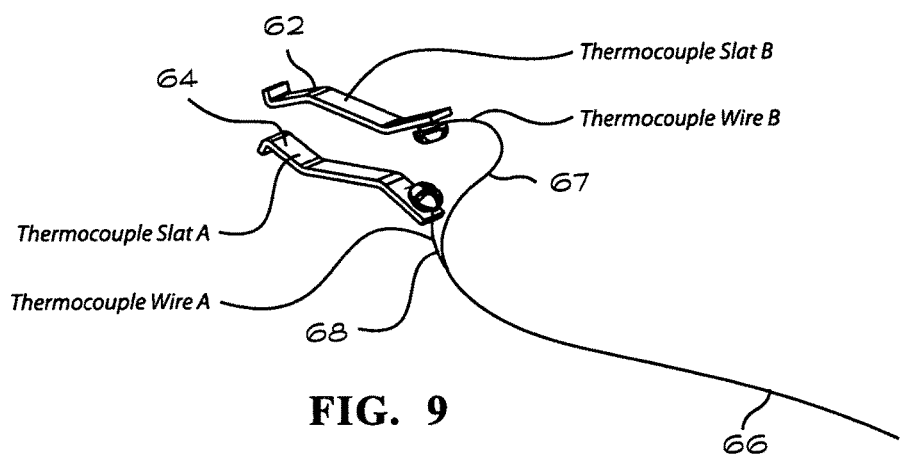
FIG. 9 is a perspective view of a pair of wires connected to the thermocouple slats of FIG. 8.
Figure 10:
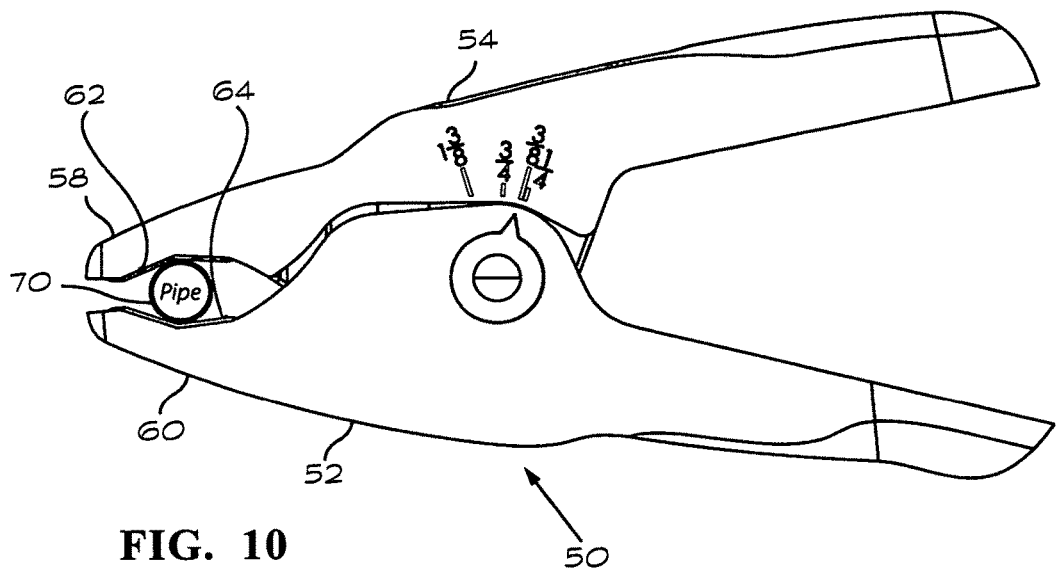
FIG. 10 is a side elevation view showing the thermocouple device of FIG. 8 being used with a small diameter pipe.
Figure 11:
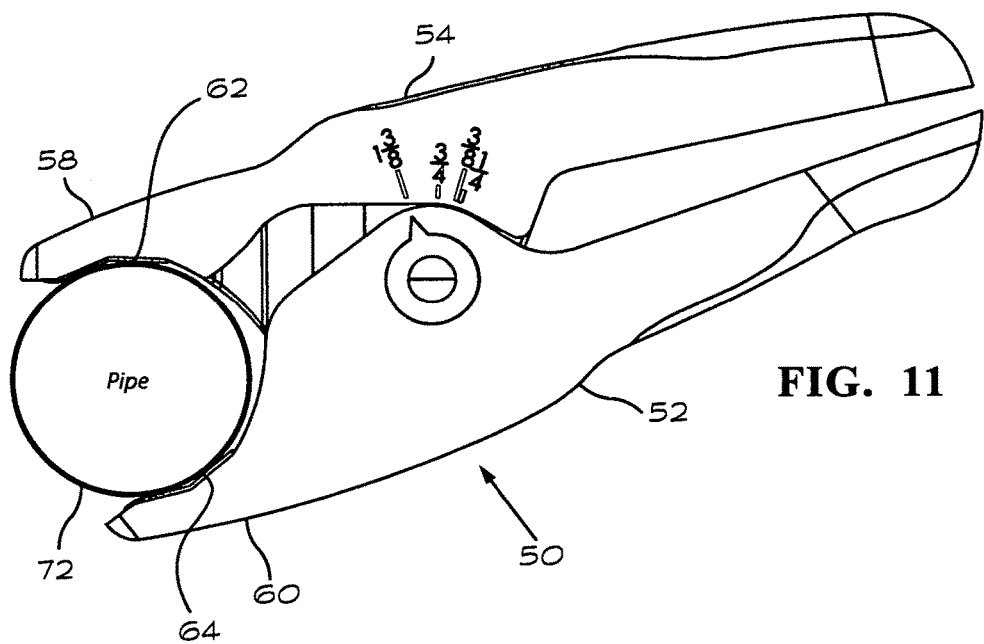
FIG. 11 is a side elevation view showing the thermocouple device of FIG. 8 being used with a large diameter pipe.

Referring to FIGS. 8 and 9, a clamp thermocouple device 50 includes two thermocouple slats 62 and 64 of K-type thermocouple material having widths of about 5 mm mounted in jaws 58 and 60. If a metal pipe (FIGS. 10 and 11) is in the jaws 58 and 60 forming an electrical and thermal contact to both slats 62 and 64, the two junctions create a voltage that may be read as a temperature. The difference between the thermocouple clamp device 50 and the embodiment of the invention described with reference to FIGS. 3-7 is that the metal thermocouple contacts in the thermocouple device 50 extend from side to side (parallel to the pipe) instead of front to back (perpendicular to the pipe). A wire assembly 66 includes thermocouple wires 67 and 68 that are connected to the thermocouple slats 62 and 64, respectively.

Figure 12:
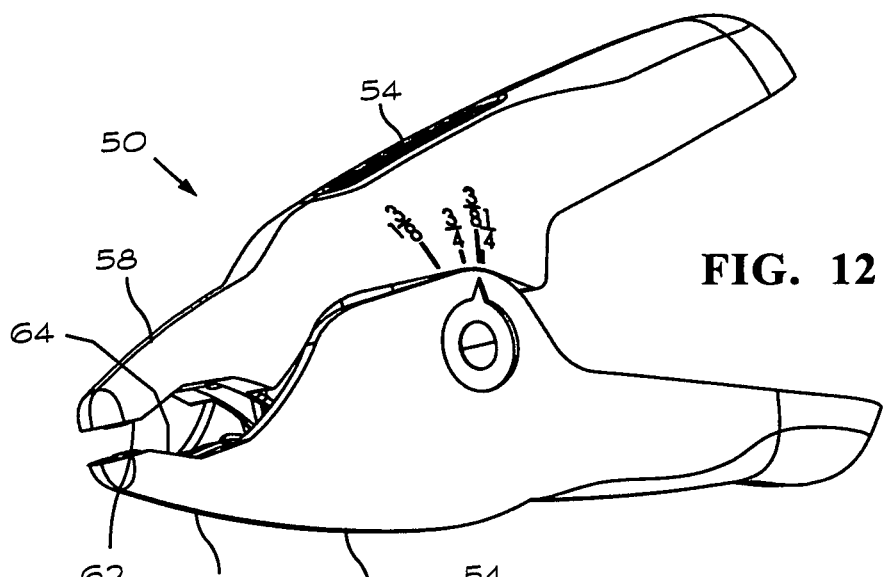
FIG. 12 is a perspective view showing the thermocouple device of FIG. 8 showing the thermocouple slats spaced apart to form an open circuit configuration.

FIG. 12 is a perspective view showing the thermocouple device 50 of FIG. 8 showing the thermocouple slats spaced apart to form an open circuit configuration.

Figure 13:
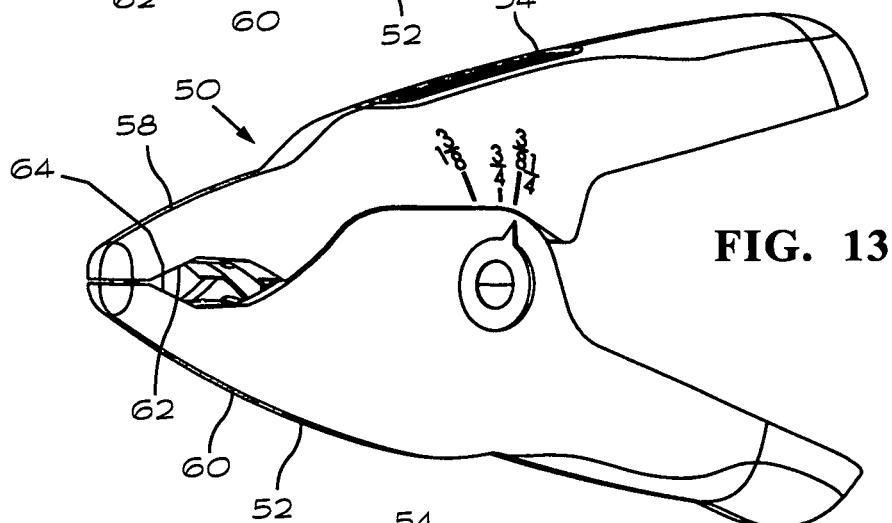
FIG. 13 is a perspective view showing the thermocouple device of FIG. 8 showing the thermocouple slats spaced apart to form a closed circuit configuration.

FIG. 13 is a perspective view showing the thermocouple device 50 of FIG. 8 showing the thermocouple slats 62 and 64 spaced apart to form a closed circuit configuration.

Figure 14:
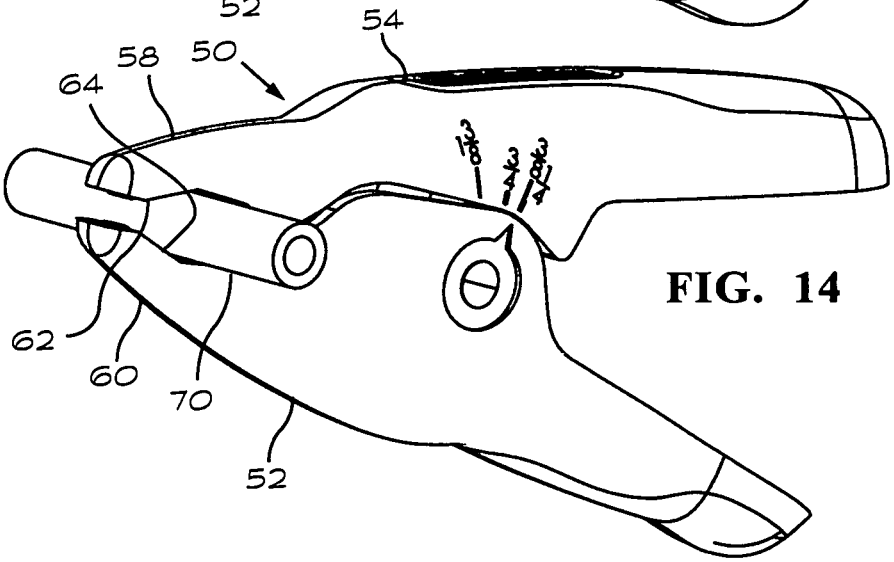
FIG. 14 is a perspective view showing the thermocouple slats in contact with an electrical conductor.

FIG. 14 is a perspective view showing the thermocouple slats 62 and 64 in contact with an electrical conductor.

What is claimed is:

1. A thermocouple assembly for measuring the temperature of a pipe, comprising:
 a pipe clamp;
 a first metal strip formed of a first metal mounted in the pipe clamp;
 a second metal strip formed of a second metal dissimilar to the first metal mounted in the pipe clamp;
 the first and second metal strips being arranged in the pipe clamp such that closing the pipe clamp on a pipe creates two thermocouple junctions where the metal strips contact the pipe;
 a thermocouple reading instrument connected to the metal strips to indicate the temperature of the pipe;
 wherein the pipe clamp has a pair of opposing clamp jaws for grasping a pipe and the first and second metal strips are mounted in a selected one of the clamp jaws.

2. The thermocouple assembly of claim 1, wherein the first and second metal strips are formed as spaced apart rails that are parallel to one another.

3. The thermocouple assembly of claim 1, wherein the first and second metal strips are spaced apart and are arranged at an angle to one another with rails going from far apart to closer together to plow contaminants off the pipe and creating a robust thermal and electrical connection.

4. A thermocouple assembly for measuring the temperature of a pipe, comprising:
 a pipe clamp;
 a first metal strip formed of a first metal mounted in the pipe clamp;
 a second metal strip formed of a second metal dissimilar to the first metal mounted in the pipe clamp;
 the first and second metal strips being arranged in the pipe clamp such that closing the pipe clamp on a pipe creates two thermocouple junctions where the metal strips contact the pipe;
 a thermocouple reading instrument connected to the metal strips to indicate the temperature of the pipe;
 wherein the pipe clamp has a first clamp jaw and a second clamp jaw and the first metal strip is formed as a first slat mounted in the first clamp jaw and the second metal strip is formed as a second slat mounted in the second clamp such that the first and second meal strips are on opposite sides of the pipe when a pipe is held between the first and second clamp jaws.

* * * * *